United States Patent

Kubota et al.

(10) Patent No.: US 10,750,186 B2
(45) Date of Patent: Aug. 18, 2020

(54) INFORMATION PROCESSING APPARATUS AND INFORMATION PROCESSING METHOD FOR CODING

(71) Applicant: FUJITSU LIMITED, Kawasaki-shi, Kanagawa (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 364 days.

(21) Appl. No.: 15/366,153

(22) Filed: Dec. 1, 2016

(65) Prior Publication Data

US 2017/0214921 A1 Jul. 27, 2017

(30) Foreign Application Priority Data

Jan. 27, 2016 (JP) .................... 2016-013820

(51) Int. Cl.
| | |
|---|---|
| *H04N 11/02* | (2006.01) |
| *H04N 19/14* | (2014.01) |
| *H04N 19/103* | (2014.01) |
| *H04N 19/154* | (2014.01) |
| *H04N 19/124* | (2014.01) |
| *H04N 19/182* | (2014.01) |
| *H04N 19/186* | (2014.01) |

(52) U.S. Cl.
CPC ........... *H04N 19/14* (2014.11); *H04N 19/103* (2014.11); *H04N 19/124* (2014.11); *H04N 19/154* (2014.11); *H04N 19/182* (2014.11); *H04N 19/186* (2014.11)

(58) Field of Classification Search
CPC .... H04N 19/14; H04N 19/103; H04N 19/124; H04N 19/154; H04N 19/182; H04N 19/186
USPC ........................ 375/240.03, 240.16; 348/699
See application file for complete search history.

(56) References Cited

U.S. PATENT DOCUMENTS

| | | | |
|---|---|---|---|
| 6,993,078 B2* | 1/2006 | Hall ..................... | H04N 19/503 375/240.16 |
| 2010/0110302 A1* | 5/2010 | Yokoyama ............. | H04N 19/53 348/699 |
| 2010/0111185 A1* | 5/2010 | Yokoyama ............. | H04N 19/61 375/240.16 |

(Continued)

FOREIGN PATENT DOCUMENTS

| | | |
|---|---|---|
| JP | 2014-131172 | 7/2014 |
| WO | 2014-103294 | 7/2014 |
| WO | 2015-098562 | 7/2015 |

*Primary Examiner* — Jayanti K Patel
*Assistant Examiner* — Richard B Carter
(74) *Attorney, Agent, or Firm* — Fujitsu Patent Center (57) ABSTRACT

An information processing apparatus includes a processor. the processor determines a sign of a first value on a basis of a result of an operation of a sum of products of a plurality of color-difference residuals and a plurality of luminance residuals, and calculates the first value on a basis of a first product of a sum of luminance residuals that are negative values among the plurality of luminance residuals and a constant when the sign of the first value is determined to be positive, and calculates the first value on a basis of a second product of a sum of luminance residuals that are positive values among the plurality of luminance residuals and the constant when the sign of the first value is determined to be negative.

9 Claims, 9 Drawing Sheets (56) References Cited

U.S. PATENT DOCUMENTS

| | | | |
|---|---|---|---|
| 2012/0027092 A1* | 2/2012 | Matsui | H04N 19/105 |
| | | | 375/240.16 |
| 2015/0016512 A1* | 1/2015 | Pu | H04N 19/176 |
| | | | 375/240.03 |
| 2016/0198175 A1 | 7/2016 | Shima et al. | |
| 2016/0261876 A1 | 9/2016 | Nakagami | |

* cited by examiner

CROSS COMPONENT RESIDUAL = COLOR-DIFFERENCE
RESIDUAL − ((LUMINANCE RESIDUAL × ($\alpha_r$ × 8))>>3)

COLOR-DIFFERENCE RESIDUAL
(ORIGINAL IMAGE − PREDICTED IMAGE)

LUMINANCE RESIDUAL
(ORIGINAL IMAGE − PREDICTED IMAGE)

$\alpha_r$
1/8

CROSS COMPONENT RESIDUAL

ERROR SUMS OF SQUARES=8

ERROR SUMS OF SQUARES=40

INFORMATION PROCESSING APPARATUS AND INFORMATION PROCESSING METHOD FOR CODING

CROSS-REFERENCE TO RELATED APPLICATION

This application is based upon and claims the benefit of priority of the prior Japanese Patent Application No. 2016-013820, filed on Jan. 27, 2016, the entire contents of which are incorporated herein by reference.

FIELD

The embodiments discussed herein are related to an information processing apparatus, an information processing method and a storage medium.

BACKGROUND

As a method of coding videos, High Efficiency Video Coding (HEVC) (or H.265) is known. Also, there is cross component prediction as a function for improving a compression rate by coding the correlation between luminance and a color difference when there is a correlation between a luminance image and a color-difference image.

In cross component prediction, coding efficiency is improved by coding a difference (residual) resulting from subtracting "luminance residual×residual scale $\alpha$" from a color-difference residual. In order to increase the encoding efficiency, conventional methods obtain residual scale $\alpha$ that results in minimum sum of squared differences $S(=\Sigma(y_i - \alpha x_i)^2)$ between a color-difference residual and luminance residual×residual scale $\alpha$. Note that $y_i$ represents a color-difference residual, which is a difference between a color-difference component of the i-th pixel of the original image and a color-difference component of a pixel of a predicted image corresponding to the pixel. $x_i$ represents a luminance residual, which is a difference between a luminance component of the i-th pixel of the original image and a luminance component of a pixel of a predicted image corresponding to the pixel. i represents a number corresponding to each pixel of an original image or a predicted image that is a process target of a cross component prediction, and satisfies i=1 through n, while n is the number of pixels in an image as a process target of cross component prediction. $\Sigma(y_i - \alpha x_i)^2$ represents the sum of squares of values obtained by subtracting, from color-difference residual $y_i$, a value obtained by multiplying residual scale $\alpha$ by luminance residual $x_i$.

However, when cross component prediction is performed on the basis of residual scale $\alpha$ resulting in above minimum sum of squared differences S in HEVC, the sum of squares between components actually calculated on the basis of a HEVC standard sometimes does not become smaller, reducing the compression rate.

Furthermore, the documents such as International Publication Pamphlet No. 2015/098562, Japanese Laid-open Patent Publication No. 2014-131172, etc. are well known.

SUMMARY

According to an aspect of the invention, an information processing apparatus includes a processor.

The processor determines a sign of a first value on a basis of a result of an operation of a sum of products of a plurality of color-difference residuals, which are differences between a color difference of each pixel of an image and a color difference of each pixel of a predicted image, and a plurality of luminance residuals, which are differences between luminance of each pixel of the image and luminance of each pixel of the predicted image.

The processor calculates the first value on a basis of a first product of a sum of luminance residuals that are negative values among the plurality of luminance residuals and a constant when the sign of the first value is determined to be positive, and calculates the first value on a basis of a second product of a sum of luminance residuals that are positive values among the plurality of luminance residuals and the constant when the sign of the first value is determined to be negative.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First, explanations will be given for cross component prediction.

Figure 1:
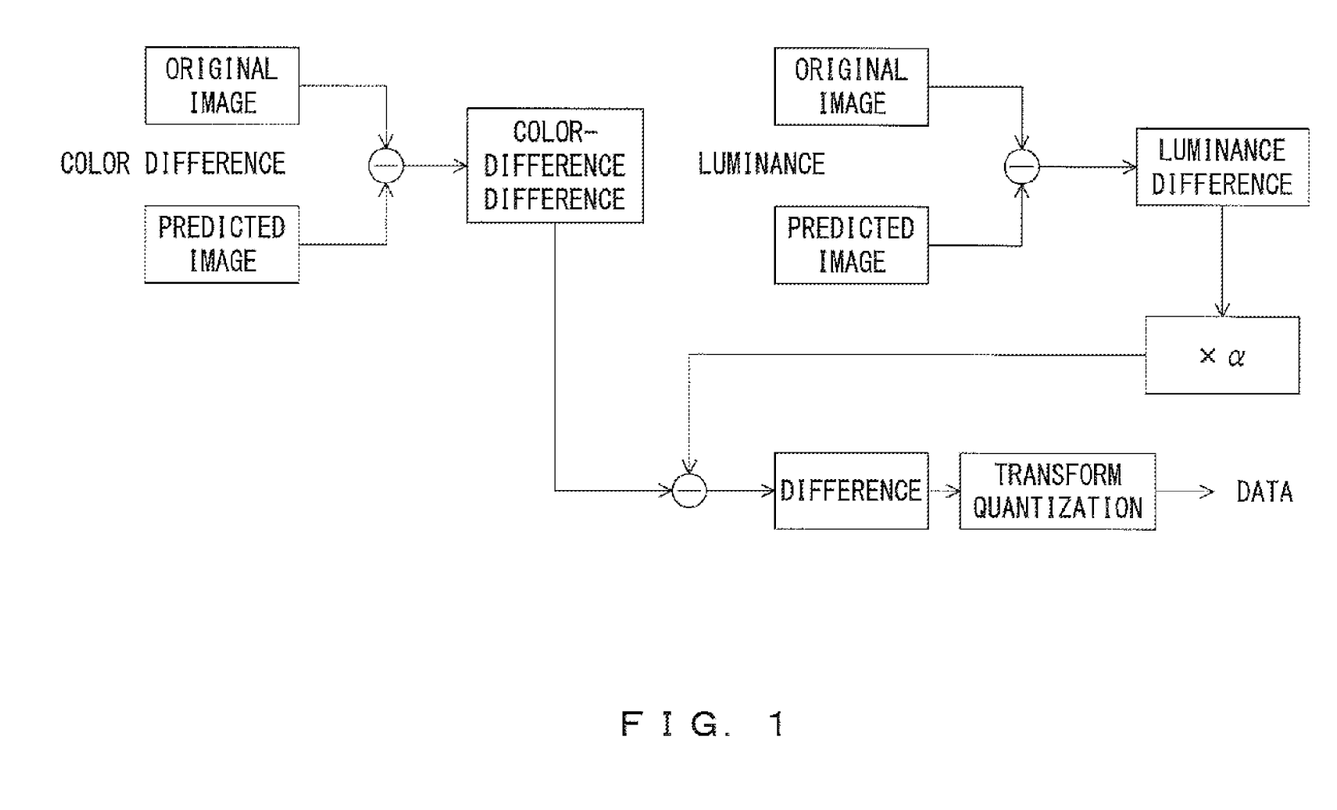
FIG. 1 illustrates a process of cross component prediction.

FIG. 1 illustrates a process of cross component prediction.

Cross component prediction is a function for improving encoding efficiency by encoding a difference (residual) obtained by subtracting, from a color-difference residual, luminance residual×residual scale $\alpha$ when there is a correlation between residuals (original image-predicted image) respectively of a luminance and a color difference.

In cross component prediction, a color-difference difference (color-difference residual) is obtained by subtracting a color-difference component of a pixel of a predicted image from a color-difference component of a pixel of an original image. Also, a luminance difference (luminance residual) is calculated by subtracting a luminance component of a pixel of a predicted image from a luminance component of a pixel of an original image. Then, by calculating a difference (cross component residual) by subtracting, from a color-difference residual, a value obtained by multiplying residual scale $\alpha$ by a luminance residual and by performing orthogonal transform and quantization (transform quantization) on the difference, data as an encoding target is calculated.

In encoding, a smaller difference between values obtained by multiplying residual scale $\alpha$ by a luminance residual and a color-difference residual leads to higher encoding efficiency. Accordingly, residual scale α resulting in a minimum sum of squares of cross component residual is used.

Conventionally, when luminance difference is $x_i$ and color-difference difference is $y_i$, α that results in minimum sum of squared differences $S=\Sigma(y_i-\alpha x_i)^2$ is calculate and used. α resulting in minimum sum of squared differences S above is calculated from $\alpha=\Sigma(x_i y_i)/\Sigma x_i^2$.

Note that in cross component prediction of HEVC, residual scale $\alpha_r$ is a discrete value in a HEVC standard. Specifically, for residual scale $\alpha_r$, a discrete value of one of −⁸⁄₈, −⁴⁄₈, −²⁄₈, −¹⁄₈, ⁰⁄₈, ⅛, ²⁄₈, ⁴⁄₈ and ⁸⁄₈ is used.

In conventional HEVC, value α resulting in minimum sum of squared differences S represented by the above equation is calculated, residual scale $\alpha_r$ close to calculated value α is calculated by quantizing the calculated value α from among residual scales $\alpha_r$ above and calculated residual scale $\alpha_r$ is used for performing cross component prediction.

Also, in calculation of cross component residual of HEVC a luminance residual, residual scale $\alpha_r$ and a value calculated by using Arithmetic right shift are used as values obtained by multiplying a residual scale by a luminance residual. In more detail, on the basis of a standard of HEVC, a cross component residual is calculated by cross component residual=color-difference residual−(luminance residual×residual scale $\alpha_r$×8)>>3. Note that >>3 represents Arithmetic right shift of three bits.

Figure 2:
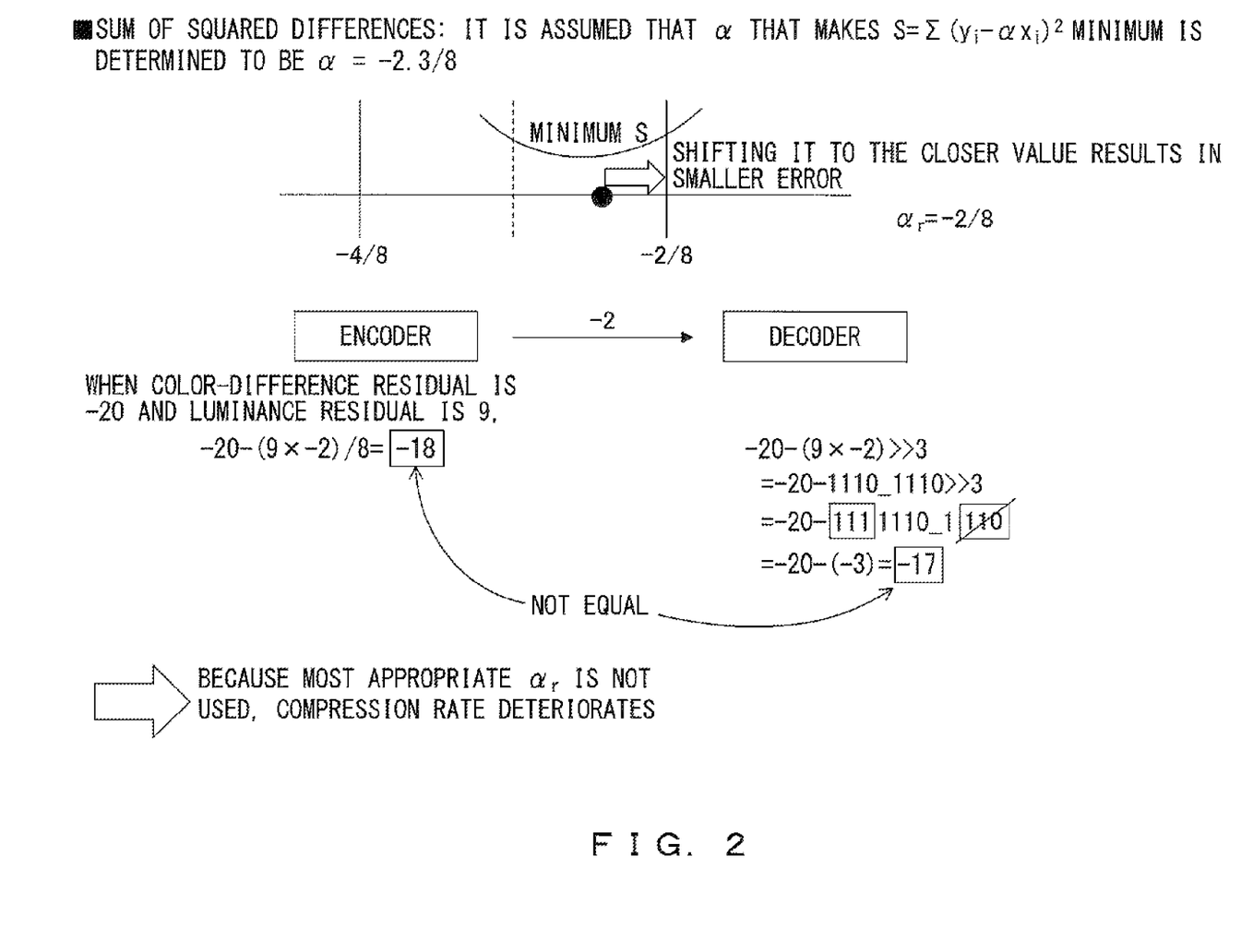
FIG. 2 illustrates calculation of a cross component residual in an encoder.

FIG. 2 illustrates calculation of a cross component residual in an encoder.

It is assumed that for performing cross component prediction, α that minimizes sum of squared differences $S=\Sigma(y_i-\alpha x_i)^2$ is calculated as −2.3/8. Calculated α is quantized, in other words, closest residual scale $\alpha_r$ is obtained from among a plurality of residual scales $\alpha_r$ defined in HEVC. In HEVC, residual scale $\alpha_r$ is a discrete value having eight as its denominator, and residual scale $\alpha_r=-2/8$, which is the closest to −2.3/8, is obtained. In HEVC, the value of the numerator (−2) of residual scale $\alpha_r$ represented by a fraction is reported to a decoder and a local decoder included in an encoder.

It is assumed herein that color-difference residual (y) is −20 and luminance residual (x) is 9.

Calculating ideal cross component residual $(y-\alpha_r x)$ by using residual scale $\alpha_r$ results in −20−(9×(−2))/8=−20−(−2.25), and rounding down the numbers after the decimal point results in −20−(−2.25)=−20−(−2)=−18.

However, in a process of cross component prediction of an encoder based on an actual standard of HEVC, arithmetic right shift of three bits (which will be referred to as >>3) is used for calculating a cross component residual.

Calculating a cross component residual by using arithmetic right shift of three bits results in the expression below.

Cross component residual = color-difference residual − (luminance residual × residual scale $\alpha_r$ × 8) >>

3 = color-difference residual − (luminance residual × value of denominator of residual scale $\alpha_r$) >> 3 = −20 − (9 × (−2)) >> 3 =

−20 − 1110_1110 >> 3 = −20 − 1111110_1 = −20 − (−3) = −17

As described above, the cross component residual that is calculated actually is not equal to the ideal cross component residual. This is caused by using arithmetic right shift for calculating a cross component residual. In other words, because numbers after the decimal point are rounded down for division while they are rounded up for arithmetic right shift for negative numbers, the above inequality occurs. Because calculation of a color-difference residual performed by a decoder is defined by color-difference residual=cross component residual+(luminance residual×value of denominator of residual scale $\alpha_r$)>>3 in a standard of HEVC, an encoder that performs a process that is in the inverse order of the process by a decoder also uses arithmetic right shift.

Limitations imposed by a standard of HEVC may result in a case as below where an intended residual is not calculated.

Figure 3:
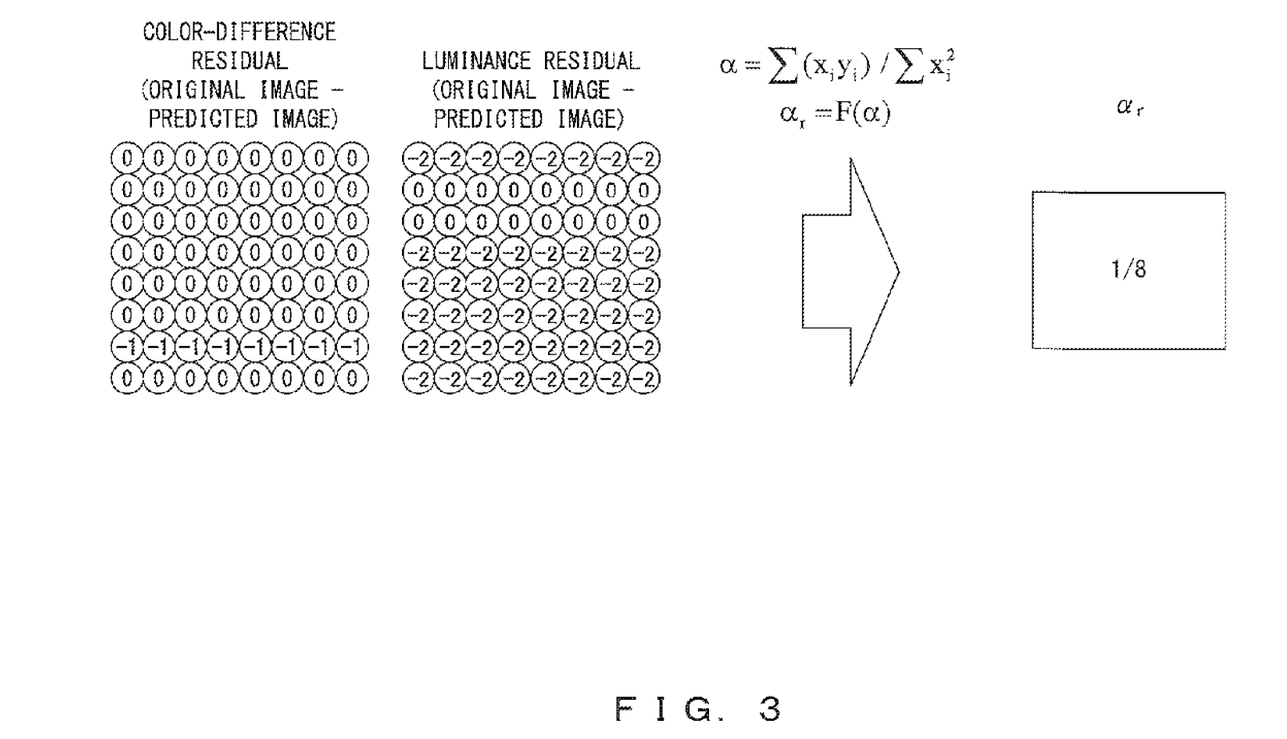
FIG. 3 illustrates examples of a color-difference residual, a luminance residual and a residual scale.

FIG. 3 illustrates examples of a color-difference residual, a luminance residual and a residual scale.

When color-difference residual $y_i$ and luminance residual $x_i$ have been calculated as illustrated in FIG. 3, residual scale α resulting in minimum sum of squared differences S is calculated by $\alpha=\Sigma(x_i y_i)/\Sigma x_i^2$, and residual scale $\alpha_r$ (=F(α)) is obtained as a result of quantizing residual scale α. F( ) is a function for performing quantization. In this example, ⅛ is calculated as residual scale $\alpha_r$.

Figure 4:
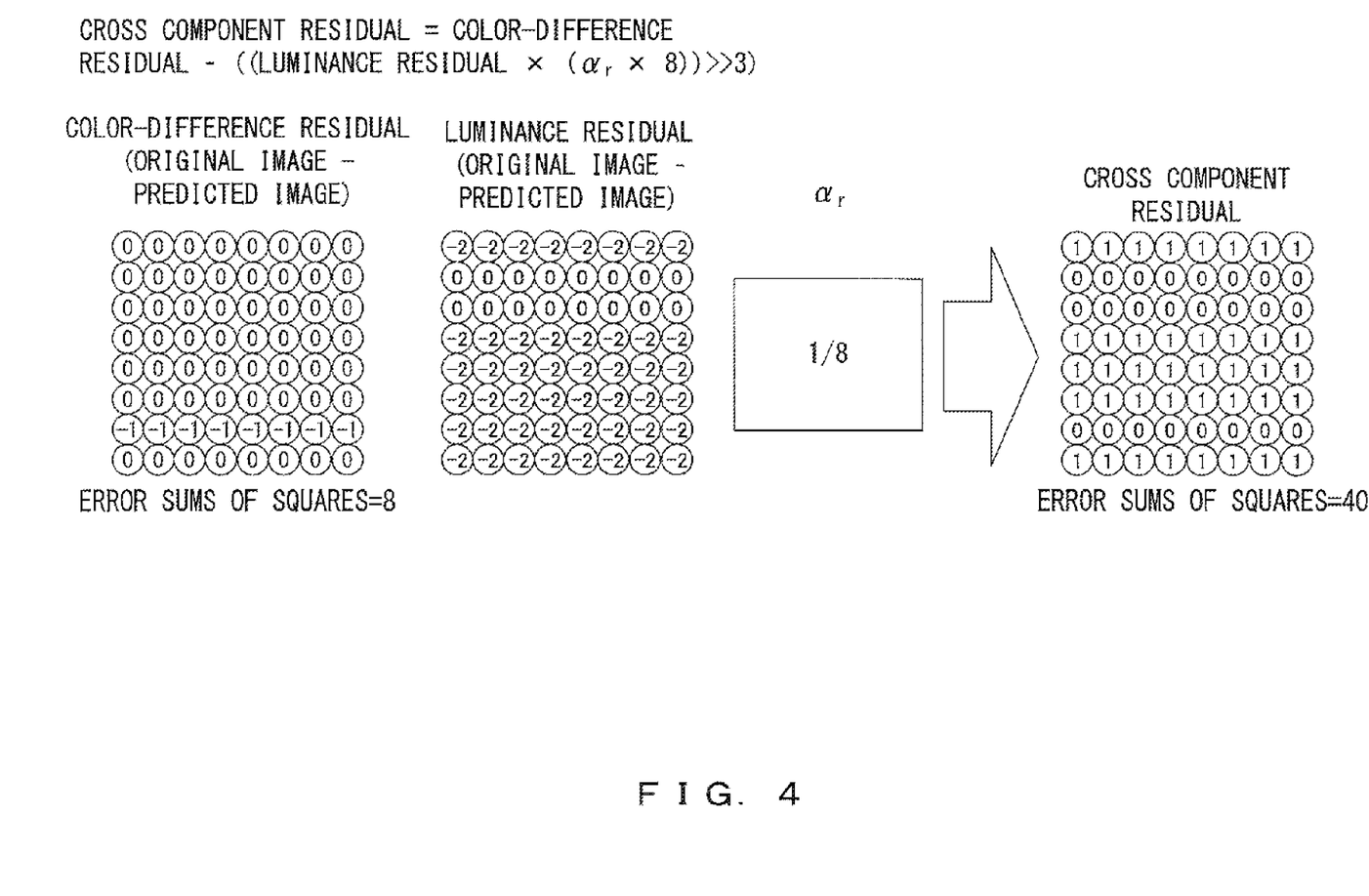
FIG. 4 illustrates an example of error sums of squares.

FIG. 4 illustrates an example of error sums of squares.

As described above, on the basis of a standard of HEVC, a cross component residual is calculated by an equation below.

Cross component residual=color-difference residual−
((luminance residual×($\alpha_r$×8))>>3).

Calculating a cross component residual by using calculated residual scale $\alpha_r=⅛$ on the basis of the above equation results in the rightmost value in FIG. 4 so that the sum of squares of the cross component residual is 40.

In FIG. 4, using sum of squares of a residual (error sums of squares) for evaluating a residual amount resulted in 8 as the error sums of squares of the color-difference residual, while the error sums of squares of a cross component residual after transform is 40, which means great deterioration.

This means that the conventional cross component prediction does not use the most appropriate residual scale $\alpha_r$, reducing the compression rate.

Hereinafter, explanations will be given for the embodiments by referring to the drawings.

First, explanations will be given for a calculation method of residual scale α in the embodiment.

When a color-difference residual is $y_i$, a luminance residual is $x_i$, and residual scale is a, sum of squared differences S is obtained by $S=\Sigma(y_i-\alpha x_i)^2$.

In HEVC, a resulting in minimum sum of squared differences S above is obtained, and $\alpha_r$ (=F(α)), which is a result of quantizing α, is obtained. Also, integer α' is obtained by α'=F(α)×8. Note that f( ) is a function for performing quantization (discretization) and 8 is of three bits of a fixed-point number. Residual scale α' is the value of the denominator of residual scale $\alpha_r$ that is represented by a fraction, and integer α'=$\alpha_r$×8. When for example calculation results in $\alpha_r$=⅛ in HEVC, integer α'=1 is satisfied.

Cross component prediction based on a standard of HEVC calculates a cross component residual by an equation below.

Cross component residual=color-difference residual
$y_i$−((luminance residual $x_i$×$\alpha_r$×8)>>3)=color-
difference residual $y_i$−((luminance residual
$x_i$×α')>>3)

The problem here is that the numbers after the decimal point are rounded up for arithmetic right shift for negative numbers while they are rounded down for arithmetic right shift for positive numbers.

Also, $(y_i - \alpha x_i)^2 = (y_i)^2 - 2\alpha x_i y_i + (x_i)^2$ is satisfied.

Accordingly, the value of $-2\alpha x_i y_i$ is a major factor to determine the magnitude of sum of squared differences S, and sum of squared differences S becomes smaller with $-2\alpha x_i y_i$ being a negative number.

Accordingly, in order to obtain minimum sum of squared differences S, it is the most appropriate for $\alpha$ to meet the conditions below.

When $\Sigma$(color-difference residual×luminance residual)>0, $\alpha>0$

When $\Sigma$(color-difference residual×luminance residual)<0, $\alpha<0$ and

When $\Sigma$(color-difference residual×luminance residual)=0, $\alpha=0$

Accordingly, calculation of residual scale $\alpha$ in the embodiment uses a different calculation method for residual scale $\alpha$ in accordance with whether residual scale $\alpha$ is positive or negative.

(1) When $\alpha>0$

In HEVC, when $\alpha>0$, a sum of squares of a cross component residual (sum of squared differences) actually calculated by using arithmetic right shift is as below. In this example, $x_{pi}$ is a luminance residual that is a positive value among luminance residuals $x_i$, while $x_{ni}$ is a luminance residual that is a negative value among luminance residuals $x_i$. Also, $y_{pi}$ is a color-difference residual corresponding to $x_{pi}$ while $y_{ni}$ is a color-difference residual corresponding to $x_{ni}$. Note that luminance residuals and color-difference residuals are treated differently on the basis of whether they are positive or negative because numbers after a decimal point are rounded up for arithmetic right shift of negative numbers while they are rounded down for arithmetic right shift of positive numbers, leading to different results.

Sum of squared differences $S = \Sigma(y_{pi} - (x_{pi} \times \alpha') >> 3)^2 + \Sigma(y_{ni} - (x_{ni} \times \alpha') >> 3)^2$ $\Sigma(y_{pi} - (x_{pi} \times \alpha') >> 3)^2$ is the sum of squares of values obtained by subtracting a value obtained by performing three-bit arithmetic right shift on a value from color-difference residual $y_{pi}$ corresponding to $x_{pi}$, the value obtained by multiplying $\alpha'$ by each luminance residual that is a positive value. $\Sigma(y_{ni} - (x_{ni} \times \alpha') >> 3)^2$ is the sum of squares of values obtained by subtracting a value obtained by performing three-bit arithmetic right shift on a value from color-difference residual $y_{ni}$ corresponding to $x_{ni}$, the value obtained by multiplying $\alpha'$ by each luminance residual that is a negative value.

Modifying the above equation results in the equation below.

$S = \Sigma(y_{pi} - (x_{pi} \times F(\alpha) \times 8) >> 3)^2 + \Sigma(y_{ni} - (x_{ni} \times F(\alpha) \times 8) >> 3)^2$ Removing F( ) from the above equation results in the equation below.

$S \approx \Sigma(y_{pi} - (x_{pi} \times (\alpha \times 8)) >> 3)^2 + \Sigma(y_{ni} - (x_{ni} \times (\alpha \times 8)) >> 3)^2 = \Sigma(y_{pi} - (x_{pi} \times \alpha))^2 + \Sigma(y_{ni} - (x_{ni} \times (\alpha \times 8)) >> 3)^2$ In this example, arithmetic right shift for negative numbers rounds up numbers after the decimal point and $(x_{ni} \times \alpha \times 8) >> 3 = (x_{ni} \times \alpha \times 8 - c')/8$ is considered, taking constant c' into consideration in order to change $x_{ni} \times (\alpha \times 8) >> 3$, which is a negative number, to division that rounds up numbers after the decimal point. When c'=7, a value obtained by rounding down the numbers after the decimal point of $(x_{ni} \times \alpha \times 8 - c')/8$ is equal to a value obtained by rounding up the numbers after the decimal point of $(x_{ni} \times \alpha \times 8)/8$.

For example, performing three-bit arithmetic right shift on $-1$ results in $-1$. Subtracting c'=7 from $-1$ and dividing the result by eight results in $((-1-7)/8(=-1.0))$, and rounding down the numbers after the decimal point results in $-1$.

Also, performing three-bit arithmetic right shift on $-7$ results in $-1$. Subtracting c'=7 from $-7$ and dividing the result by eight results in $((-7-7)/8(=-1.75))$, and rounding down the numbers after the decimal point results in $-1$.

Organizing the equations results in $(x_{ni} \times \alpha \times 8 - c')/8 \approx (x_{ni} \times \alpha) - (c'/8)$.

For c=(c'/8), organizing the equation results in the equation below.

$\Sigma(y_{pi} - (x_{pi} \times \alpha))^2 + \Sigma(y_{ni} - (x_{ni} \times (\alpha \times 8)) >> 3)^2 \approx \Sigma(y_{pi} - (x_{pi} \times \alpha))^2 + \Sigma(y_{ni} - (x_{ni} \times \alpha - c))^2$ When c'=7, c=(c'/8)=⅞ becomes a reasonable value. Also, generalizing c results in c=((2^q)-1)/2^q. q is a constant and q=3 in for example HEVC.

As described above, in a case when arithmetic right shift used for calculating a cross component residual is taken into consideration, when offset is given for rounding up numbers after a decimal point with $\alpha x_i$ being negative, sum of squared differences S is represented by $S = \Sigma(y_{pi} - \alpha x_{pi})^2 + \Sigma(y_{ni} - (\alpha x_{ni} - c))^2$.

$\Sigma(y_{pi} - \alpha x_{pi})^2$ is the sum of squares of values obtained by subtracting a value from color-difference residual $y_{pi}$ corresponding to $x_{pi}$, the value obtained by multiplying residual scale $\alpha$ by each luminance residual that is a positive value. $\Sigma(y_{ni} - (\alpha x_{ni} - c))^2$ is the sum of squares of values obtained by subtracting a value from color-difference residual $y_{ni}$ corresponding to $x_{ni}$, the value obtained by subtracting rounding-up number c from a value obtained by multiplying residual scale $\alpha$ by each luminance residual that is a negative value.

In the embodiment, a that results in minimum sum of squared differences S is obtained. Developing the above equation of sum of squared differences S results in the equation below.

$S = \Sigma(y_{pi} - \alpha x_{pi})^2 + \Sigma(y_{ni} - (\alpha x_{ni} - c))^2 = \Sigma(y_{pi}^2 + \alpha^2 - 2\alpha x_{pi} y_{pi}) + \Sigma(y_{ni}^2 - 2\alpha x_{ni} y_{ni} + 2c y_{ni} + \alpha^2 x_{ni}^2 - 2c\alpha x_{ni} + c^2)$ In order to obtain a that results in minimum sum of squared differences S, a condition of $\partial S/\partial \alpha = 0$ is imposed by performing partial differentiation on S by $\alpha$.

$\partial S/\partial \alpha = \Sigma(2\alpha x_{pi}^2 - 2x_{pi} y_{pi}) + \Sigma(-2x_n y_{ni} + 2\alpha x_{ni}^2 - 2c x_{ni}) = 0$ Solving the above equation results in the equation below.

$\alpha = (\Sigma(x_{pi} y_{pi}) + \Sigma(x_{ni} y_{ni}) + \Sigma(c x_{ni}))/(\Sigma(x_{pi}^2) + \Sigma(x_{ni}^2))$ In the above equation, when luminance residual $x_{pi}$, which is a positive value, and luminance residual $x_{ni}$, which is a negative value, are collectively treated as luminance residual $x_i$, $\alpha = (\Sigma(x_i y_i) + \Sigma(c x_{ni}))/\Sigma(x_i^2)$ is obtained. It is also assumed that $\alpha = \text{Clip3}(0, \infty, \alpha)$. $\alpha = \text{Clip3}(0, \infty, \alpha)$ means that when $\alpha$ is a negative value, $\alpha = 0$ and when $\alpha$ is a positive value, it is a value that calculated $\alpha$. $\Sigma(x_i y_i)$ is the sum of products of a luminance residual and a color-difference residual, and $\Sigma(c x_{ni})$ is a value obtained by multiplying rounding-up number c by the sum of luminance residuals, which are negative values. Also, $\Sigma(x_i^2)$ is the sum of squares of luminance residuals.

(2) When $\alpha<0$

Similarly to the case where $\alpha>0$, when offset is given for rounding up numbers after a decimal point with $\alpha x_i$ being negative, sum of squared differences S is represented by $S = \Sigma(y_{pi} - (\alpha x_{pi} - c))^2 + \Sigma(y_{ni} - \alpha x_{ni})^2$. $\Sigma(y_{pi} - (\alpha x_{pi} - c))^2$ is the sum of squares of values obtained by subtracting a value from color-difference residual $y_{pi}$ corresponding to $x_{pi}$, the value obtained by subtracting rounding-up number c from a value obtained by multiplying residual scale α by each luminance residual that is a positive value. $\Sigma(y_{ni}\alpha x_{ni})_2$ is the sum of squares of values obtained by subtracting a value from color-difference residual $y_{ni}$ corresponding to $x_{ni}$, the value obtained by multiplying residual scale α by each luminance residual that is a negative value.

Obtaining α in the same method as in the above case where α>0 results in α=($\Sigma(x_i y_i)+\Sigma(cx_{pi}))/\Sigma(x_i^2)$. Also, it is assumed that α=Clip3 (−∞, 0, α). α=Clip3(−∞, 0, α) means that when α is a positive value, α=0 and when α is a negative value, it is a value that calculated α. $\Sigma(x_i y_i)$ is the sum of products of a luminance residual and a color-difference residual, and $\Sigma(cx_{pi})$ is a value obtained by multiplying rounding-up number c by the sum of luminance residuals, which are negative values. Also, $\Sigma(x_1^2)$ is a sum of squares of luminance residuals.

(3) When α=0

It is assumed that α=0.

Hereinafter, explanations will be given for a device and a method for calculating residual scale α as described above.

Figure 5:
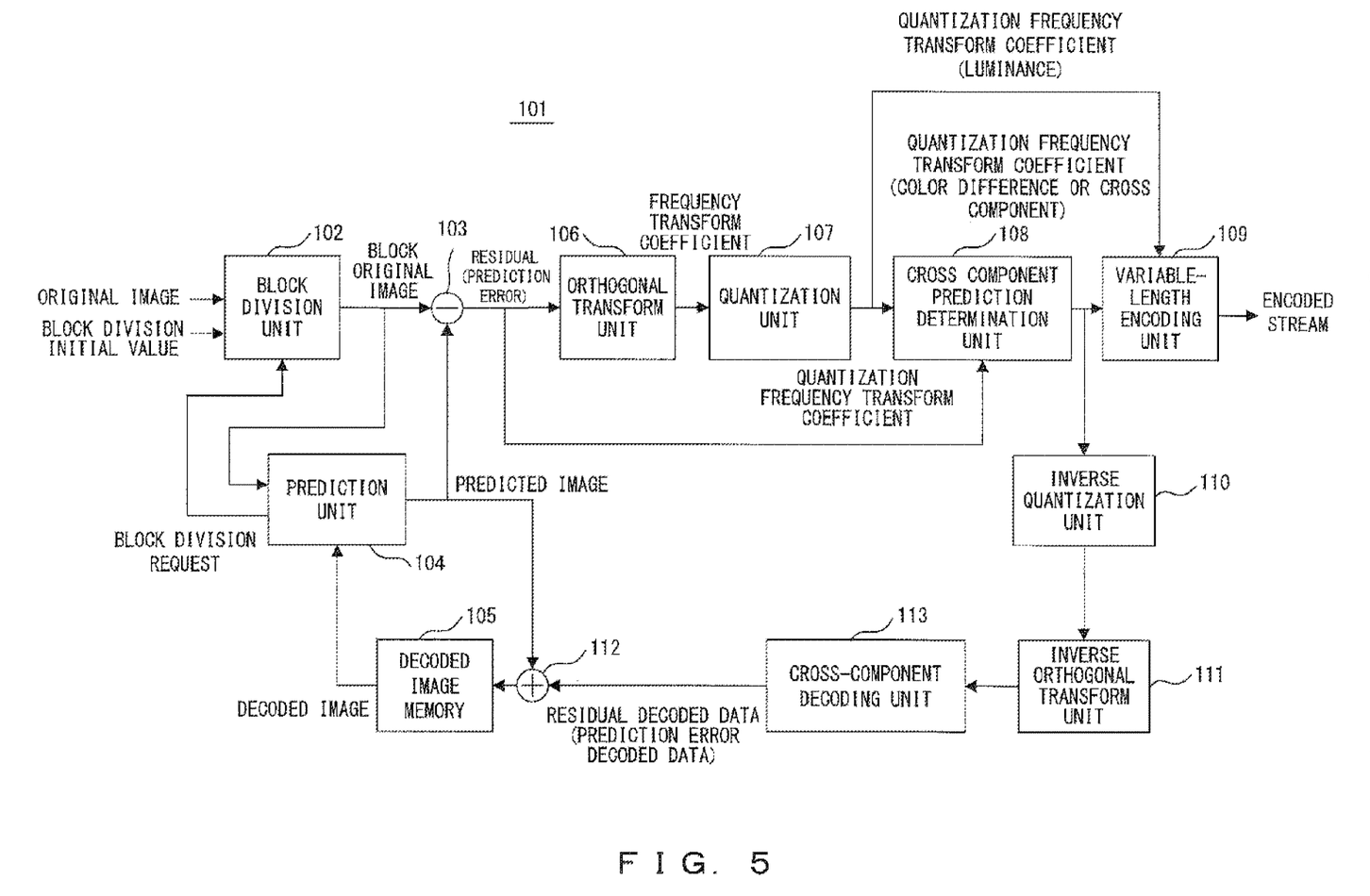
FIG. 5 illustrates a configuration of an image encoding device according to an embodiment.

FIG. 5 illustrates a configuration of an image encoding device according to the embodiment.

An image encoding device 101 includes a block division unit 102, a subtraction unit 103, a prediction unit 104, a decoded image memory 105, an orthogonal transform unit 106, a quantization unit 107, a cross component prediction determination unit 108, a variable-length encoding unit 109, an inverse quantization unit 110, an inverse orthogonal transform unit 111 and an addition unit 112.

The block division unit 102 receives a block division initial value representing one of the patterns of block division defined by an encoding standard and an original image. The block division unit 102 sets a block division initial value as an initial value, performs block division on the original image on the basis of the block division initial value and outputs a block original image. A block original image is image data obtained by dividing a block of a block size common between a plurality of patterns of block division into a block size of the initial value.

The subtraction unit 103 calculates a residual (prediction error) by subtracting a predicted image from a block original image so as to output it to the orthogonal transform unit 106 and the cross component prediction determination unit 108.

The prediction unit 104 creates, by intra-picture prediction or inter-picture prediction, a predicted image that is closest to the block original image from a decoded image stored in the decoded image memory 105, and outputs it to the subtraction unit 103 and the addition unit 112. Also, the prediction unit 104 makes, to the block division unit 102, a request for a block original image equivalent to the pattern of block division defined by an encoding standard so as to perform a similar process, and creates and outputs a predicted image that is closest to the block original image.

The decoded image memory 105 stores a decoded image output from the addition unit 112.

The orthogonal transform unit 106 performs orthogonal transform on an input residual so as to calculate a frequency transform coefficient, and outputs it to the quantization unit 107.

The quantization unit 107 performs a quantization process on a frequency transform coefficient so as to calculate a quantization frequency transform coefficient, and outputs it. The quantization unit 107 outputs a quantization frequency transform coefficient of a color difference to the cross component prediction determination unit 108. Also, the quantization unit 107 outputs a quantization frequency transform coefficient of a luminance to the variable-length encoding unit 109 and the inverse quantization unit 110.

The cross component prediction determination unit 108 outputs, to the variable-length encoding unit 109 and the inverse quantization unit 110, the one with a smaller encoding amount between a quantization frequency transform coefficient of a color difference and a quantization frequency transform coefficient between components. Note that the cross component prediction determination unit 108, when outputting a quantization frequency transform coefficient, outputs also residual scale $α_r$ used for cross component prediction to the variable-length encoding unit 109 and the inverse quantization unit 110.

The variable-length encoding unit 109 encodes a quantization frequency transform coefficient of a luminance and a quantization frequency transform coefficient input from the cross component prediction determination unit 108, and outputs an encoded stream.

The inverse quantization unit 110 performs an inverse quantization process on a quantization frequency transform coefficient of a luminance and a quantization frequency transform coefficient output from the cross component prediction determination unit 108, and calculates an inverse quantization frequency transform coefficient so as to output it to the inverse orthogonal transform unit 111. Note that the inverse quantization unit 110, in case of receiving residual scale $α_r$, outputs residual scale $α_r$ to the inverse orthogonal transform unit 111 together with an inverse quantization frequency transform coefficient.

The inverse orthogonal transform unit 111 performs an inverse orthogonal transform process on the input inverse quantization frequency transform coefficient so as to calculate residual decoded data (prediction error decoded data) so as to output it to a cross-component decoding unit 113. The inverse orthogonal transform unit 111, in case of receiving residual scale $α_r$, outputs residual scale $α_r$ to the cross-component decoding unit 113 together with residual decoded data (prediction error decoded data).

The addition unit 112 calculates a decoded image of the block original image by adding a predicted image and residual decoded data (prediction error decoded data) so as to output it to the decoded image memory 105.

When cross component prediction has been used for encoding, i.e., when the cross component prediction determination unit 108 has output a quantization frequency transform coefficient between components, the cross-component decoding unit 113 calculates a color-difference residual from the input residual decoded data (prediction error decoded data).

When cross component prediction has been used for encoding, residual decoded data (prediction error decoded data) input to the cross-component decoding unit 113 is a cross component residual and a luminance residual.

When the image encoding device 101 performs encoding based on HEVC, the cross-component decoding unit 113 calculates a color-difference residual from color-difference residual=cross component residual+(luminance residual× value of numerator of residual scale α r)>>3, and outputs the color-difference residual and the luminance residual to the addition unit 112 as residual decoded data (prediction error decoded data).

When cross component prediction is not used for encoding, the cross-component decoding unit 113 transfers input residual decoded data (prediction error decoded data) to the addition unit 112. When cross component prediction is not used for encoding, the residual decoded data (prediction error decoded data) input to the cross-component decoding unit 113 is a color-difference residual and a luminance residual.

Figure 6:
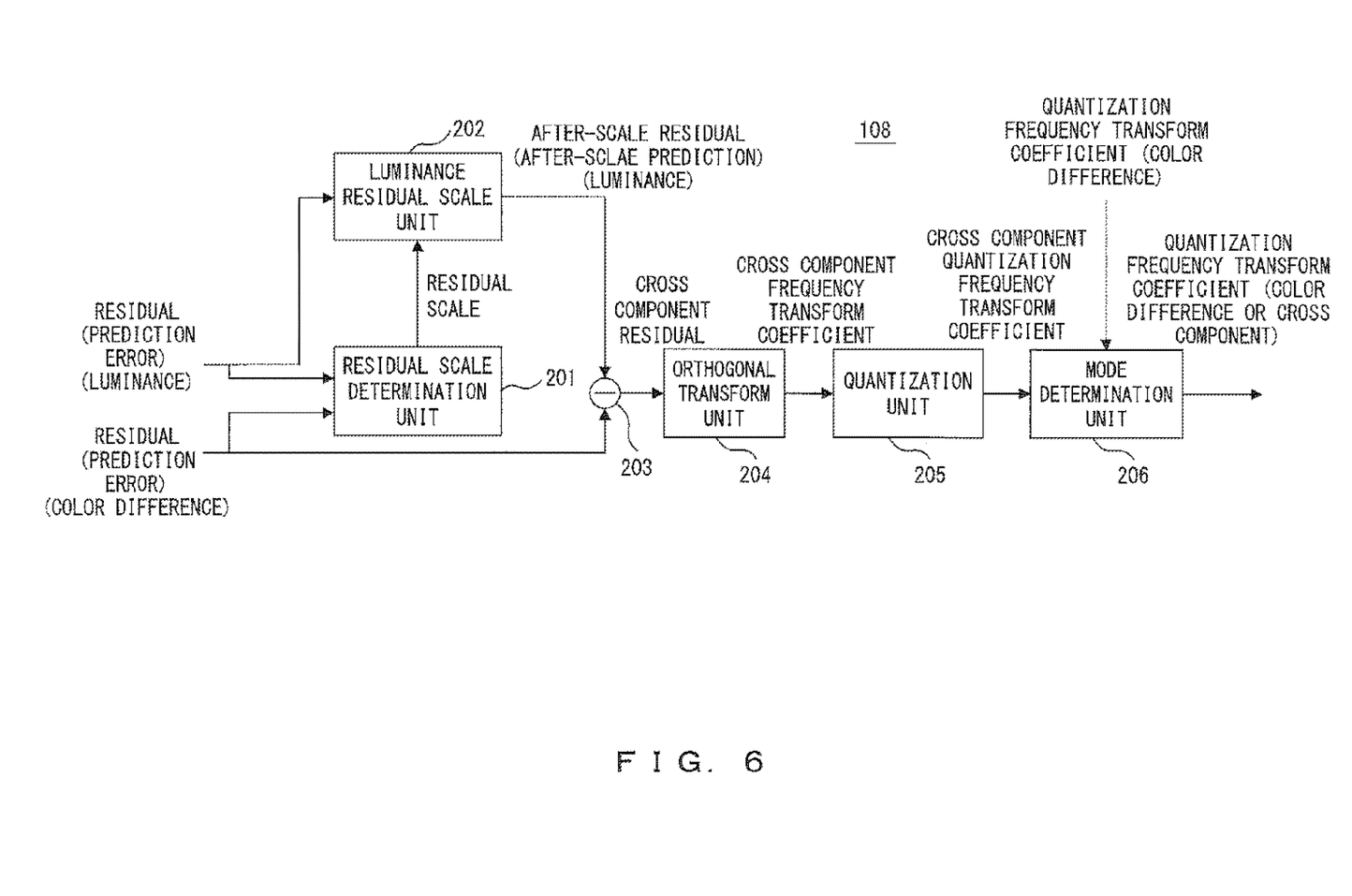
FIG. 6 illustrates a configuration of a cross component prediction determination unit.

FIG. 6 illustrates a configuration of a cross component prediction determination unit.

The cross component prediction determination unit 108 includes a residual scale determination unit 201, a luminance residual scale unit 202, a subtraction unit 203, an orthogonal transform unit 204, a quantization unit 205 and a mode determination unit 206.

The residual scale determination unit 201 calculates residual scale ($\alpha_r$) on the basis of the input luminance residual (prediction error) and color-difference residual (prediction error) so as to output it to the luminance residual scale unit 202. As described above, residual scale ($\alpha_r$) is represented by a fraction (such as ⅛) in HEVC.

The luminance residual scale unit 202 receives a luminance residual (prediction error) and residual scale ($\alpha_r$), multiples the value of the numerator of residual scale ($\alpha_r$) by each element of the luminance residual (prediction error) so as to perform an arithmetic right shift operation of q bits (q=3 in HEVC for example) on the multiplication result and thereby calculates an after-luminance-scale residual (after-luminance-scale prediction error) so as to output it to the subtraction unit 203. Note that the value of the numerator of residual scale $\alpha_r$ is calculated by multiplying a constant (constant=2^q=8 in HEVC for example) by residual scale $\alpha_r$.

The subtraction unit 203 calculates across component residual by subtracting the after-luminance-scale residual (after-luminance-scale prediction error) from the color-difference residual (prediction error) so as to output it to the orthogonal transform unit 204. The luminance residual scale unit 202 and the subtraction unit 203 are examples of a difference calculation unit.

The orthogonal transform unit 204 performs orthogonal transform on the input cross component residual so as to calculate a cross component frequency transform coefficient and outputs it to the quantization unit 205.

The quantization unit 205 performs quantization on the input cross component frequency transform coefficient so as to calculate a cross component quantization frequency transform coefficient, and outputs it to the mode determination unit 206.

The mode determination unit 206 receives a cross component quantization frequency transform coefficient and a quantization frequency transform coefficient of a color difference, and outputs the one with a smaller encoding amount between the cross component quantization frequency transform coefficient and the quantization frequency transform coefficient of a color difference.

Figure 7:
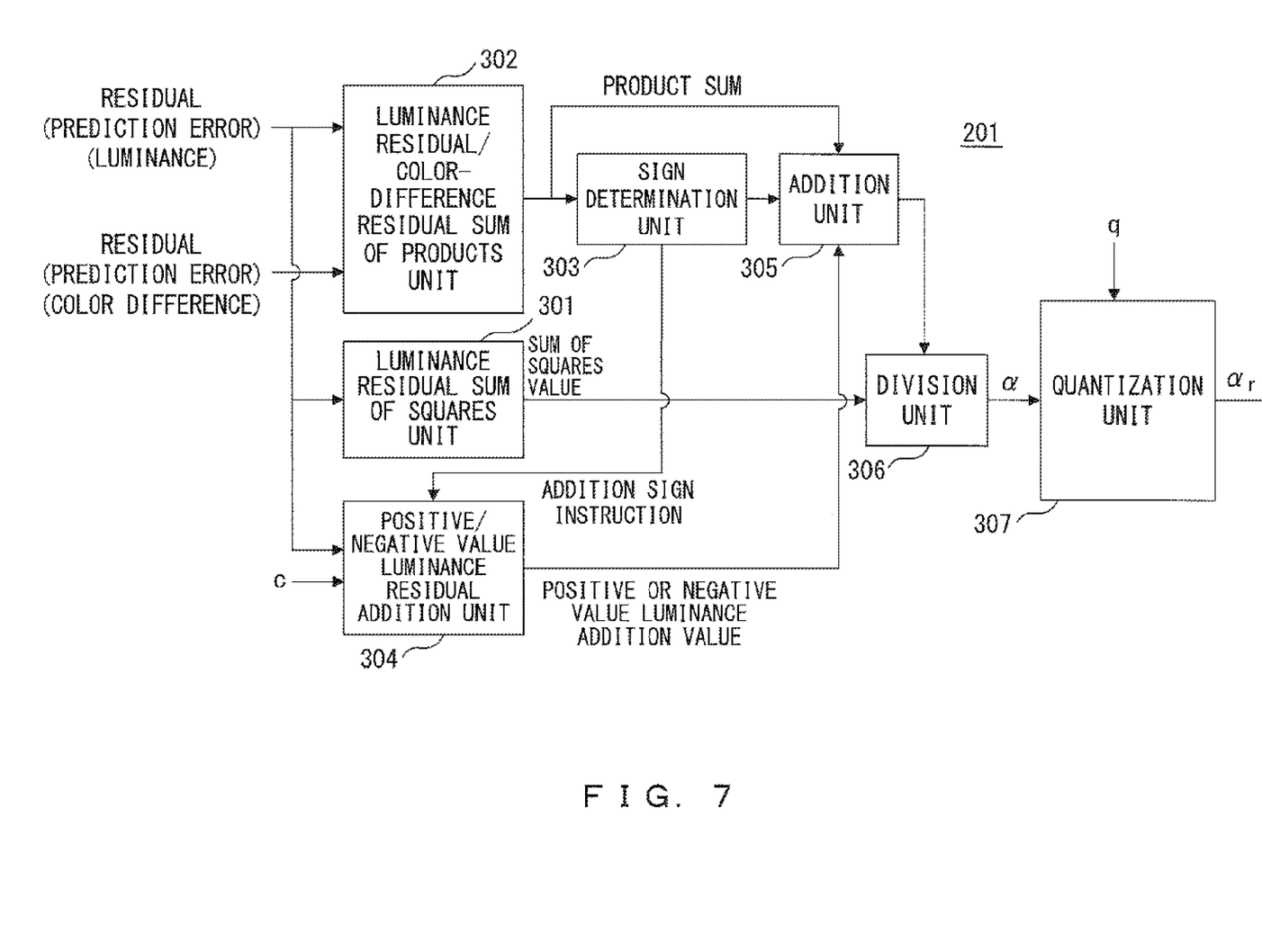
FIG. 7 illustrates a configuration of a residual scale determination unit.

FIG. 7 illustrates a configuration of a residual scale determination unit.

The residual scale determination unit 201 includes a luminance residual sum of squares unit 301, a luminance residual/color-difference residual sum of products unit 302, a sign determination unit 303, a positive/negative value luminance residual addition unit 304, an addition unit 305, a division unit 306 and a quantization unit 307. The luminance residual sum of squares unit 301, the luminance residual/color-difference residual sum of products unit 302, the sign determination unit 303, the positive/negative value luminance residual addition unit 304, the addition unit 305 and the division unit 306 are examples of a calculation unit.

The luminance residual sum of squares unit 301 calculates the sum of squares of a luminance residual ($\Sigma(x_i^2)$).

The luminance residual/color-difference residual sum of products unit 302 performs an operation of the sum of products of the luminance residual and the color-difference residual so as to calculate product sum ($\Sigma(x_i y_i)$).

The sign determination unit 303 determines the sign of product sum ($\Sigma(x_i y_i)$), i.e., whether the product sum is a positive value, a negative value or zero. The sign determination unit 303 reports the addition sign instruction to the positive/negative value luminance residual addition unit 304 on the basis of the determination result. The addition sign instruction represents addition of a luminance residual as a negative value when the product sum is a positive value, and represents addition of a luminance residual as a positive value when the product sum is a negative value.

On the basis of the addition sign instruction, the positive/negative value luminance residual addition unit 304 calculates a luminance addition value (negative value luminance addition value $\Sigma(cx_{ni})$ or positive value luminance value $\Sigma(cx_{pi})$) obtained by multiplying rounding-up number c by a luminance residual as a positive value or a negative value.

The addition unit 305 adds product sum ($\Sigma(x_i y_i)$) and luminance addition value ($\Sigma(cx_{ni})$ or $\Sigma(cx_{pi})$) so as to calculate the addition value.

The division unit 306 divides an addition value by the sum of squares of the luminance residual so as to calculate residual scale $\alpha$, the addition value having been calculated by the addition unit 305 and the luminance residual having been calculated by the luminance residual sum of squares unit 301. Note that product sum ($\Sigma(x_i y_i)$) that is greater than zero results in residual scale $\alpha=(\Sigma(x_i y_i)+\Sigma(cx_{ni}))/\Sigma(x_i^2)$. Also, product sum ($\Sigma(x_i y_i)$) that is smaller than zero results in residual scale $\alpha=(\Sigma(x_i y_i)+\Sigma(cx_{pi}))/\Sigma(x_i^2)$.

The quantization unit 307 quantizes residual scale $\alpha$ on the basis of constant q so as to calculate residual scale $\alpha_r$. For example, constant q=3 and $\alpha_r=a/2\textasciicircum q$, (a=−8, −4, −2, −1, 0, 1, 2, 4, or 8) in a standard of HEVC. For example, the quantization unit 307 calculates residual scale $\alpha_r$ as described below.

Figure 8:
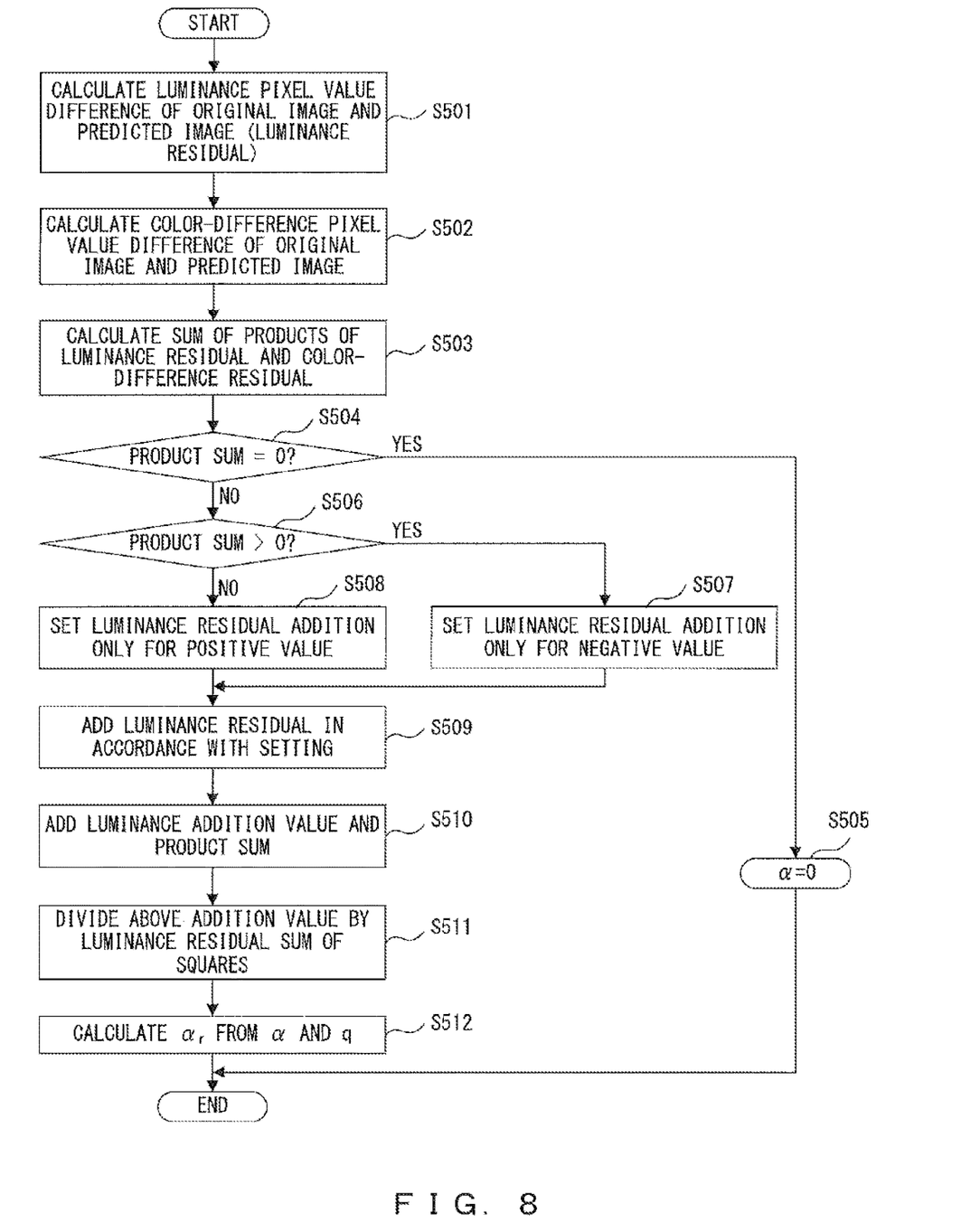
FIG. 8 is a flowchart of a residual scale calculation process of the embodiment.

When $\alpha=0$, residual scale $\alpha_r=0$
When $\alpha>0$ and $0<|\alpha|<3/16$, residual scale $\alpha_r=\frac{1}{8}$
When $\alpha<0$ and $0<|\alpha|<3/16$, residual scale $\alpha_r=-\frac{1}{8}$
When $\alpha>0$ and $3/16\leq|\alpha|<6/16$, residual scale $\alpha_r=\frac{2}{8}$
When $\alpha<0$ and $3/16\leq|\alpha|<6/16$, residual scale $\alpha_r=-\frac{2}{8}$
When $\alpha>0$ and $6/16\leq|\alpha|<12/16$, residual scale $\alpha_r=\frac{4}{8}$
When $\alpha<0$ and $6/16\leq|\alpha|<12/16$, residual scale $\alpha_r=-\frac{4}{8}$
When $\alpha>0$ and $12/16\leq|\alpha|$, residual scale $\alpha_r=\frac{8}{8}$
When $\alpha<0$ and $12/16\leq|\alpha|$, residual scale $\alpha_r=-\frac{8}{8}$ FIG. 8 is a flowchart of a residual scale calculation process of the embodiment.

In this example, explanations will be given for a calculation method of a residual scale for one of a plurality of divisional blocks.

In step S501, the subtraction unit 103 calculates a luminance pixel difference (luminance residual) by subtracting a predicted image of luminance from a block original image of luminance in each pixel of a block.

In step S502, the subtraction unit 103 calculates a color-difference pixel difference (color-difference residual) by subtracting a predicted image of a color difference from a block original image of a color difference in each pixel of a block.

In step S503, the luminance residual/color-difference residual sum of products unit 302 performs an operation of a sum of products of a luminance residual and a color-difference residual so as to calculate a product sum ($\Sigma(x_i y_i)$).

In step S504, the sign determination unit 303 determines whether or not the product sum is zero. When the product sum is zero, the control proceeds to step S505, and when the product sum is not zero, the control proceeds to step S506.

In step S505, the sign determination unit 303 sets residual scale α to zero. The sign determination unit 303 reports, to the quantization unit 307, residual scale α=0, and the quantization unit 307 outputs residual scale $α_r$=0.

In step S506, the sign determination unit 303 determines whether or not the product sum is greater than zero. When the product sum is greater than zero, the control proceeds to step S507, and when the product sum is not greater than zero, the control proceeds to step S508. On the basis of the determination result, the sign determination unit 303 reports an addition sign instruction to the positive/negative value luminance residual addition unit 304.

In step S507, the positive/negative value luminance residual addition unit 304 sets that only luminance residual ($x_{ni}$) that is a negative value is added.

In step S508, the positive/negative value luminance residual addition unit 304 sets that only luminance residual ($x_{pi}$) that is a positive value is added.

In step S509, in accordance with the setting made in step S507 or step S508, the positive/negative value luminance residual addition unit 304 calculates a luminance addition value ($\Sigma(cx_{ni})$ or $\Sigma(cx_{pi})$), which is a result of multiplying rounding-up number c by luminance residuals of a positive value or a negative value and totaling them. The positive/negative value luminance residual addition unit 304 outputs the calculated luminance addition value to the addition unit 305.

In step S510, the addition unit 305 adds product sum ($\Sigma(x_iy_i)$) and luminance addition value ($\Sigma(cx_{ni})$ or $\Sigma(cx_{pi})$) so as to calculate the addition value.

In step S511, the luminance residual sum of squares unit 301 calculates sum of squares ($\Sigma(x_1^2)$) of a luminance residual. Then, the division unit 306 calculates residual scale α by dividing an addition value by the sum of squares of a luminance, the addition value having been calculated in step S510. Note that product sum ($\Sigma(x_iy_i)$) that is greater than zero results in residual scale $α=(\Sigma(x_iy_i)+\Sigma(cx_{ni}))/\Sigma(x_i^2)$. Also, product sum ($\Sigma(x_iy_i)$) that is greater than zero results in residual scale $α=(\Sigma(x_iy_i)+\Sigma(cx_{pi}))/\Sigma(x_i^2)$.

In step S512, the quantization unit 307 quantizes residual scale α on the basis of constant q so as to calculate residual scale $α_r$. Residual scale $α_r$ is represented by fraction having $2^q$ as its denominator. For example, in a standard of HEVC, constant q=3 and residual scale $α_r$ is one of −8/8, −4/8, −2/8, −1/8, 0/8, 1/8, 2/8, 4/8 or 8/8. The quantization unit 307 outputs calculated residual scale $α_r$. Also, the quantization unit 307 may output the value of the numerator of residual scale $α_r$, which is represented by a fraction. In other words, the quantization unit 307 may output one of the values −8, −4, −2, −1, 0, 1, 2, 4 or 8.

According to an image encoding device of the embodiment can calculate residual scale α that results in a minimum sum of squares of cross component residuals that are calculated by using arithmetic right shift.

According to an image encoding device of the embodiment, calculating a cross component residual by using residual scale $α_r$ obtained by quantizing calculated residual scale α so as to encode it makes it possible to improve the compression rate of encoding that uses cross component prediction.

Figure 9:
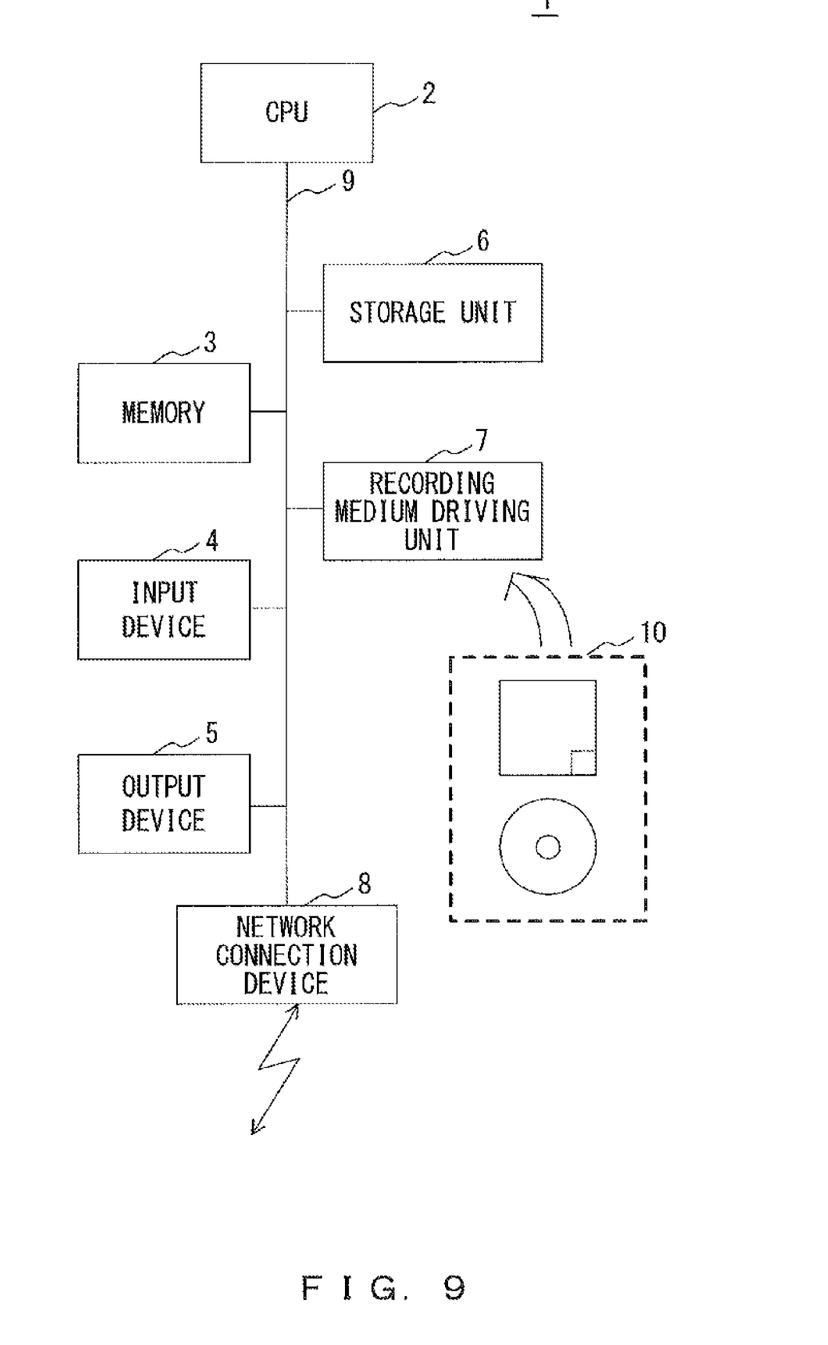
FIG. 9 illustrates a configuration of an information processing apparatus (computer).

FIG. 9 illustrates a configuration of an information processing apparatus (computer).

The image encoding device 101 of the embodiment can be implemented by for example an information processing apparatus (computer) 1 as illustrated in FIG. 9.

The information processing apparatus 1 includes a CPU 2, a memory 2, an input device 4, an output device 5, a storage unit 6, a recording medium driving unit 7 and a network connection device 8, all of which are connected to each other via a bus 9.

The CPU 2 is a central processing unit that controls the entire information processing apparatus 1. The CPU 2 operates as the block division unit 102, the subtraction unit 103, the prediction unit 104, the orthogonal transform unit 106, the quantization unit 107, the cross component prediction determination unit 108, the variable-length encoding unit 109, the inverse quantization unit 110, the inverse orthogonal transform unit 111, the addition unit 112 and the cross-component decoding unit 113.

The memory 3 is a memory such as a Read Only Memory (ROM), a Random Access Memory (RAM), etc. that, for execution of a program, temporarily stores a program or data stored in the storage unit 6 (or the portable recording medium 10). The CPU executes a program by using the memory 3 so as to perform the above described various types of programs. The memory 3 corresponds to the decoded image memory 105.

In such a case, the program itself read from a portable recording medium 10 etc. implements the functions of the embodiment.

The input device 4 is used for inputting instructions or information from the user or the operator and for obtaining data etc. used by the information processing apparatus 1. Examples of the input device 4 include a keyboard, a mouse a touch panel, a camera, a sensor, etc.

The output device 5 is a device that outputs questions and processing results to the user and the operator and operates under the control of the CPU 2. Examples of the output device 5 include a display device, a printer, etc.

Examples of the storage unit 6 include a magnetic disk device, an optical disk device, a tape device, etc. The information processing apparatus 1 stores the above program and data in the storage unit 6 so as to read them onto the memory 3 to use them on an as-needed basis.

The recording medium driving unit 7 drives the portable recording medium 10 so as to access recorded content in it. For a portable recording medium, an arbitrary computer-readable recording medium such as a memory card, a flexible disk, a Compact Disk Read Only Memory (CD-ROM), an optical disk, a magneto-optical disk, etc. can be used. The user stores the above program and data in the portable recording medium 10 so as to read them onto the memory 3 to use them on an as-needed basis.

The network connection device 8 is a communication interface that is connected to an arbitrary communication network such as a Local Area Network (LAN), a Wide Area Network (WAN), etc. so as to perform data conversion accompanying the communications. The network connection device 8 transmits data to a device connected via a communication network or receives data from a device connected via a communication network.

Note that the present invention is not limited to the above particular embodiment but can be implemented by a combination of various modifications, changes, and processes of the respective examples without departing from the spirit of the present invention.

For example, a residual scale is calculated in units of blocks in FIG. 8, while a residual scale can also be calculated in units of original images.

Also, the present invention is not limited to coding schemes of HEVC. For example, the present invention can be applied to coding schemes that use a residual scale, coding schemes that use a cross component residual and coding schemes that have a problem which is the same as or similar to that of the present invention.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a processor configured to
      determine a sign of a product sum obtained from a result of an operation of a sum of products of a plurality of color-difference residuals, which are differences between a color difference of each pixel of an image and a color difference of a corresponding pixel of a predicted image, and a plurality of luminance residuals, which are differences between luminance of each pixel of the image and luminance of the corresponding pixel of the predicted image, each pixel of the image corresponding to the corresponding pixel of the predicted image,
      divide a first addition value by a sum of squares of each of the plurality of luminance residuals so as to calculate a first value when the sign of the product sum is determined to be positive, the first addition value being obtained by adding to the product sum a first product of a sum of first luminance residuals and a first coefficient value, the first luminance residuals being negative values among differences between luminance of each pixel of the image and luminance of the corresponding pixel of the predicted image,
      divide a second addition value by a sum of squares of each of the plurality of luminance residuals so as to calculate the first value when the sign of the product sum is determined to be negative, the second addition value being obtained by adding to the product sum a second product of a sum of second luminance residuals and the first coefficient value, the second luminance residuals being positive values among differences between luminance of each pixel of the image and luminance of the corresponding pixel of the predicted image,
      quantize the first value so as to calculate a second value, and
      subtract a value from the plurality of color-difference residuals so as to calculate a cross component residual, the value being obtained by multiplying the second value and a second coefficient value by the plurality of luminance residuals and performing arithmetic right shift on the result thereof.

2. The information processing apparatus according to claim 1, wherein
   the processor
      calculates the first value as zero when the product sum is zero.

3. The information processing apparatus according to claim 1, wherein
   the first value is a value that results in a minimum sum of squares of the cross component residual.

4. An information processing method executed by an information processing apparatus, the information processing method comprising:
   determining, by a processor, a sign of a product sum obtained from a basis of a result of an operation of a sum of products of a plurality of color-difference residuals, which are differences between a color difference of each pixel of an image and a color difference of a corresponding pixel of a predicted image, and a plurality of luminance residuals, which are differences between luminance of each pixel of the image and luminance of the corresponding pixel of the predicted image, each pixel of the image corresponding to the corresponding pixel of the predicted image;
   dividing, by the processor, a first addition value by a sum of squares of each of the plurality of luminance residuals so as to calculate a first value when the sign of the product sum is determined to be positive, the first addition value being obtained by adding to the product sum a first product of a sum of first luminance residuals and a first coefficient value, the first luminance residuals being negative values among differences between luminance of each pixel of the image and luminance of the corresponding pixel of the predicted image;
   dividing, by the processor, a second addition value by a sum of squares of each of the plurality of luminance residuals so as to calculate the first value when the sign of the product sum is determined to be negative, the second addition value being obtained by adding to the product sum a second product of a sum of second luminance residuals and the first coefficient value, the second luminance residuals being positive values among differences between luminance of each pixel of the image and luminance of the corresponding pixel of the predicted image;
   quantizing, by the processor, the first value so as to calculate a second value; and
   subtracting, by the processor, a value from the plurality of color-difference residuals so as to calculate a cross component residual, the value being obtained by multiplying the second value and a second coefficient value by the plurality of luminance residuals and performing arithmetic right shift on the result thereof.

5. The information processing method according to claim 4, further comprising:
   calculating, by the processor, the first value as zero when the product sum is zero.

6. The information processing method according to claim 4, wherein
   the first value is a value that results in a minimum sum of squares of the cross component residual.

7. A non-transitory storage medium having stored therein a program that cases a computer to execute a process, the process comprising:
   determining a sign of a product sum obtained from a result of an operation of a sum of products of a plurality of color-difference residuals, which are differences between a color difference of each pixel of an image and a color difference of a corresponding pixel of a predicted image, and a plurality of luminance residuals, which are differences between luminance of each pixel of the image and luminance of the corresponding pixel of the predicted image, each pixel of the image corresponding to the corresponding pixel of the predicted image;
   dividing a first addition value by a sum of squares of each of the plurality of luminance residuals so as to calculate a first value when the sign of the product sum is determined to be positive, the first addition value being obtained by adding to the product sum a first product of a sum of first luminance residuals and a first coefficient value, the first luminance residuals being negative values among differences between luminance of each pixel of the image and luminance of the corresponding pixel of the predicted image;

dividing a second addition value by a sum of squares of each of the plurality of luminance residuals so as to calculate the first value when the sign of the product sum is determined to be negative, the second addition value being obtained by adding to the product sum a second product of a sum of second luminance residuals and the first coefficient value, the second luminance residuals being positive values among differences between luminance of each pixel of the image and luminance of the corresponding pixel of the predicted image;

quantizing the first value so as to calculate a second value; and subtracting a value from the plurality of color-difference residuals so as to calculate a cross component residual, the value being obtained by multiplying the second value and a second coefficient value by the plurality of luminance residuals and performing arithmetic right shift on the result thereof.

8. The non-transitory storage medium according to claim 7, wherein
the process further comprises:
calculating the first value as zero when the product sum is zero.

9. The non-transitory storage medium according to claim 7, wherein
the first value is a value that results in a minimum sum of squares of the cross component residual.

* * * * *